July 24, 1934.  J. L. WOODBRIDGE  1,967,801
CHARGING SYSTEM FOR STORAGE BATTERIES
Filed March 24, 1933
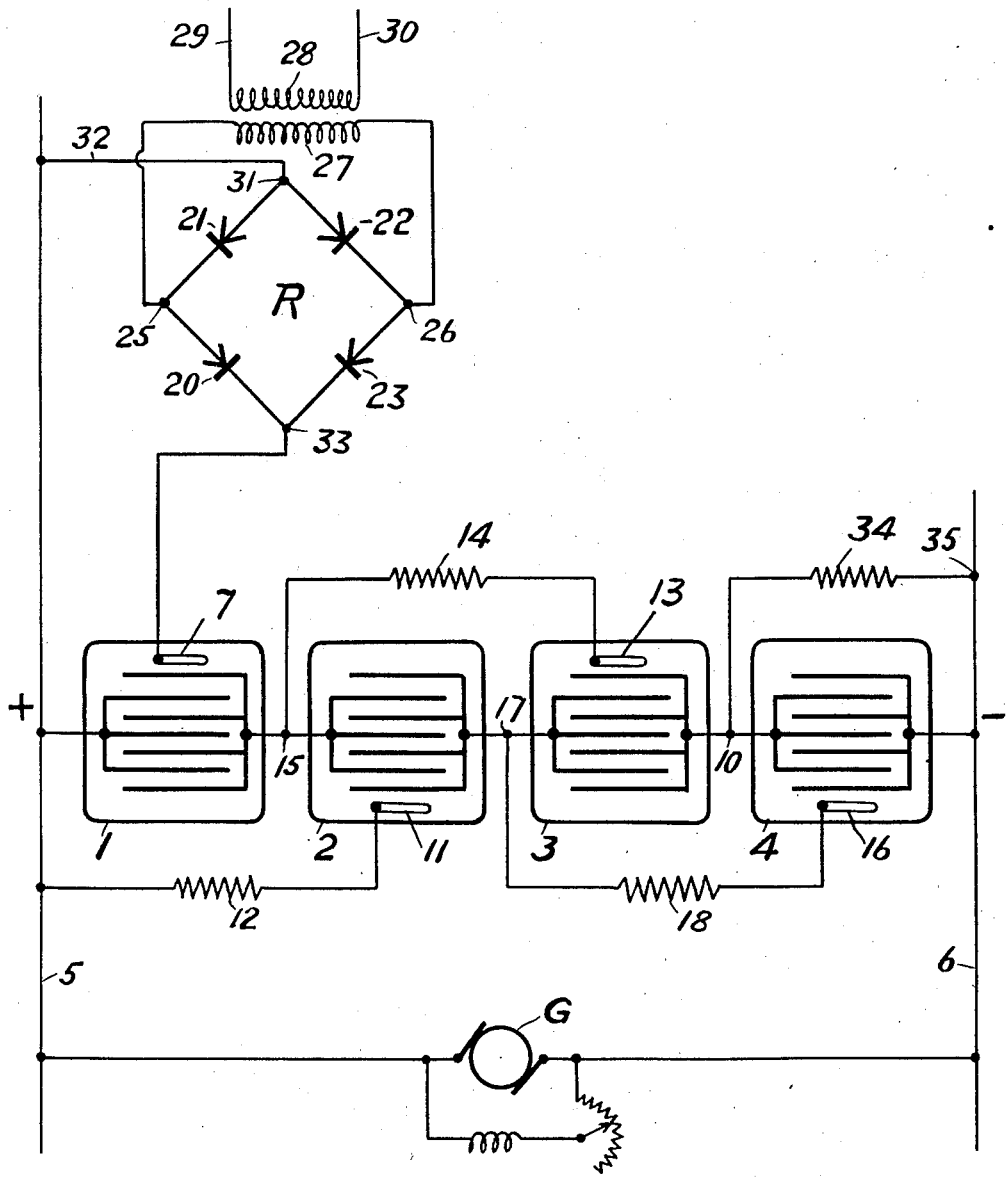
WITNESS:
INVENTOR
Joseph Lester Woodbridge
BY
Augustus B. Stoughton
ATTORNEY.

Patented July 24, 1934

1,967,801

UNITED STATES PATENT OFFICE 1,967,801

CHARGING SYSTEM FOR STORAGE BATTERIES

Joseph Lester Woodbridge, Philadelphia, Pa., assignor to The Electric Storage Battery Company, Philadelphia, Pa., a corporation of New Jersey Application March 24, 1933, Serial No. 662,435

3 Claims. (Cl. 171—314)

It is customary in many commercial applications of storage batteries to connect the battery continuously across a constant voltage, direct current circuit, adjusting the voltage of the circuit to give the battery continuously a low rate (so called, trickle) charge just sufficient to compensate for local action in the cells and maintain the battery in a fully charged condition. The amount of trickle charge current required to keep the negative plates in a fully charged condition is usually somewhat greater than that required by the positive plates. It is therefore necessary in order to avoid gradual discharge of the negatives to subject the cells to a higher rate of trickle charge current than would be required by the positives, thus subjecting the positives to an appreciable amount of overcharge which has a tendency to shorten the life of the plate. In order to maintain this higher rate of trickle charge, it is necessary to maintain across the cells a somewhat higher floating voltage than would be necessary if the trickle charge could be reduced to the current required for the positives.

An object of this invention is to supply to the negative plates in a series of storage battery cells the amount of trickle charge current required to compensate for local action and keep the negatives fully charged without passing this entire trickle charge current through the positive plates, the positive plates being subject only to the amount of trickle charge current they require. To accomplish this result, an auxiliary electrode is located in each cell connected to a point in the series of cells of higher positive potential, thus passing charging current into the negative plates in excess of that passing through the positives and then diverting a similar amount of charging current from a point in the circuit between the cell in question and the next cell in the negative direction to prevent this additional current from passing through the positive plates in the next cell. This diverted current is passed into the auxiliary electrode of the second cell in the negative direction from the one first mentioned in order to provide additional charging current to the negative plates in that cell.

The invention of the present application comprises an improvement over the prior art such as the device shown in application Serial No. 662,224, in the name of Harry W. Beedle. In this device, current is taken from the positive conductor of the main source of direct current and is passed through a voltage boosting means and delivered to the auxiliary electrode in the first cell. The invention will be more clearly understood by reference to the accompanying drawing showing diagrammatically the arrangement of a circuit involving the invention applied to four cells of a storage battery.

In the drawing four storage battery cells numbered respectively 1, 2, 3 and 4 are connected in series across the direct current supply circuit 5, 6, to which is connected any suitable source of direct current, such as the shunt wound generator G. Without the auxiliary circuits of this invention to be described below, the voltage of the generator G will be adjusted to pass through the cells a sufficient amount of trickle charge current to keep the positive plates fully charged, this current as stated above being insufficient to keep the negatives in a fully charged condition. In order to supply the additional current required by the negatives, an auxiliary electrode is immersed in the electrolyte of each cell connected to the auxiliary circuits now to be described.

In cell 1 the auxiliary electrode is shown at 7 and unidirectional current is supplied to this electrode from the positive conductor 5 through the boosting rectifier R. This rectifier comprises the well known arrangement of four rectifying elements 20, 21, 22 and 23 arranged respectively in the four branches of a Wheatstone bridge of which the two opposite junction points 25 and 26 are connected across the secondary winding 27 of a transformer whose primary winding 28 is connected across any suitable source of alternating current such as the circuit 29, 30. One of the other two junction points of the Wheatstone bridge, namely 31, is connected to the positive conductor 5 by means of conductor 32, and the other junction point 33 is connected to the auxiliary electrode 7. The rectifier R is connected in the direction to take current from the positive conductor 5 and transmit this at a higher voltage to electrode 7, thus supplying via electrode 7 to the negative plates in cell 1 an amount of current sufficient to supplement the charging current passing through the positive plates from conductor 5 and provide a sufficient total amount of charging current to the negative plates to keep them in a fully charged condition.

The auxiliary electrode 11 in cell 2 is connected to the positive conductor 5 through a fixed resistance 12, the value of this resistance being such as to supply to the electrode 11 the necessary trickle charge current to supplement the trickle charge current passing through the positive plates by an amount necessary to keep the negative plates in cell 2 in a fully charged condition. Similarly auxiliary electrode 13 in cell 3 is connected through resistance 14 to the junction point 15 in the circuit between cell 1 and cell 2, the value of resistance 14 being such as to supply the necessary current to electrode 13 to supplement the charging current passing through the positives in cell 3 so as to provide sufficient trickle charge current to the negatives in cell 3 to keep them in a fully charged condition. It will be noted that the current diverted through the resistance 14 will be substantially the same as the current supplied to the auxiliary electrode 7, so that the total charging current which has passed through the negative plates in cell 1 is reduced by the amount of current diverted through resistance 14 and only the current required by the positive plates in cell 2 is allowed to pass through them. In the same manner auxiliary electrode 16 in cell 4 is connected to the junction point 17 between cell 2 and cell 3 through a fixed resistance 18 of suitable value to permit the necessary excess current to pass from electrode 16 through the negative plates in cell 4 to keep them in a fully charged condition.

Starting from the junction point 10 between cells 3 and 4 a circuit is shown comprising resistance 34 and connected at junction point 35 with the negative conductor 6. The value of the resistance 34 is chosen to divert from the positive plates in cell 4 the excess charging current furnished to the negative plates in cell 3 by auxiliary electrode 13.

From the above description it will be noted that a system is provided by which the positive plates in a series of cells are furnished with just enough trickle charge current to keep them in a fully charged condition, and by means of an auxiliary electrode in each cell the negative plates are furnished with enough additional current to keep them in a fully charged condition. To furnish this additional current the auxiliary electrode in each cell must be maintained at a somewhat higher potential than the positive plates in that cell, and this is accomplished by connecting this auxiliary electrode to a point in the series of cells having a higher potential, this point being preferably chosen at the junction between the next two cells toward the positive end of the battery with a suitable resistance included in the circuit to control the current at the proper value. The auxiliary electrode in the first cell at the positive end of the battery is maintained at a higher potential than the positive plates in that cell by means of an auxiliary source of boosting potential connected between the positive side of the main source of direct current and the auxiliary electrode in the first cell. The excess current supplied to the negative plates in the next to the last cell at the negative end of the battery is diverted from the positive plates in the last cell by means of an auxiliary circuit including a resistor 34 connected from the junction point 10 between the last two cells and the negative side of the main source of direct current.

I claim:

1. In a storage battery charging system comprising a series of storage cells connected across a source of direct current, means for supplying charging current to the negative plates in the positive cells in excess of that supplied to the positive plates, said means comprising auxiliary electrodes in the cells, each of said electrodes except that in the first cell at the positive end being connected to a point in the series of cells having a higher positive potential than that of the positive plates in the cell in which the auxiliary electrode is located, means for supplying current to the auxiliary electrode in the first cell at the positive end, comprising a source of boosting voltage connected between the positive conductor of the source of direct current and said auxiliary electrode, and a circuit comprising a resistance connected from the junction point between the last two cells in the series to the negative conductor of the source.

2. A storage battery charging system including in combination a storage battery cell, positive and negative plates in said cell, an auxiliary electrode in said cell, a source of direct current connected to said plates, means for passing excess current through the negative plates over that passed through the positive plates, said means comprising a rectifier connected between the positive side of the source of direct current and the auxiliary electrode and a source of alternating current connected to said rectifier.

3. A storage battery charging system including in combination a storage battery cell, positive and negative plates in said cell, an auxiliary electrode in said cell, a source of direct current connected to said plates, means for passing excess current through the negative plates over that passed through the positive plates, said means comprising a source of boosting voltage connected between the positive side of the source and the auxiliary electrode.

JOSEPH LESTER WOODBRIDGE.